(12) United States Patent
Wiemers (10) Patent No.: US 8,435,391 B2
(45) Date of Patent: May 7, 2013

(54) ELECTROCOAGULATION APPARATUS WITH IN-PLACE ELECTRODE CLEANING

(75) Inventor: Reginald A. Wiemers, Littleton, CO (US)

(73) Assignee: Rockwater Resource LLC, Denver, CO (US)

( * ) Notice: Subject to any disclaimer, the term of this patent is extended or adjusted under 35 U.S.C. 154(b) by 411 days.

(21) Appl. No.: 12/452,776

(22) PCT Filed: Jul. 31, 2008

(86) PCT No.: PCT/US2008/009255
§ 371 (c)(1),
(2), (4) Date: Jan. 22, 2010

(87) PCT Pub. No.: WO2009/017788
PCT Pub. Date: Feb. 5, 2009

(65) Prior Publication Data
US 2010/0116652 A1    May 13, 2010

Related U.S. Application Data

(63) Continuation-in-part of application No. 11/888,512, filed on Aug. 1, 2007, now abandoned.

(51) Int. Cl.
*C02F 1/463* (2006.01)
(52) U.S. Cl.
USPC ........................................ 204/275.1; 205/742
(58) Field of Classification Search .................. 204/269, 204/278.5; 205/732–775
See application file for complete search history.

(56) References Cited

U.S. PATENT DOCUMENTS

| | | | |
|---|---|---|---|
| 4,349,430 A * | 9/1982 | Efimov et al. .................. | 204/237 |
| 4,383,920 A | 5/1983 | Muller et al. .................... | 210/87 |
| 5,238,574 A | 8/1993 | Kawashima et al. ......... | 210/652 |
| 5,244,579 A | 9/1993 | Horner et al. .................. | 210/652 |
| 5,320,755 A | 6/1994 | Hagqvist et al. .............. | 210/652 |
| 5,460,723 A | 10/1995 | Bourbigot et al. ............. | 210/639 |
| 5,547,584 A | 8/1996 | Capehart ....................... | 210/669 |
| 5,558,775 A | 9/1996 | Busch, Jr. ...................... | 210/638 |
| 5,607,593 A | 3/1997 | Cote et al. ...................... | 210/650 |
| 5,632,892 A | 5/1997 | Klein .......................... | 210/257.2 |
| 5,647,973 A | 7/1997 | Desaulniers .................. | 210/96.2 |
| 5,741,416 A | 4/1998 | Tempest, Jr. .................... | 210/90 |
| 5,756,874 A * | 5/1998 | Steward ........................ | 588/302 |

(Continued)

FOREIGN PATENT DOCUMENTS

GB    2284906    6/1995

OTHER PUBLICATIONS

International Search Report and Written Opinion, dated Nov. 4, 2008, from corresponding International Patent Application No. PCT/US2008/009255.

*Primary Examiner* — Nicholas A Smith
*Assistant Examiner* — Ciel Thomas
(74) *Attorney, Agent, or Firm* — Greenberg Traurig, LLP (57) ABSTRACT

An electrocoagulation wastewater treatment apparatus is disclosed wherein a primary electrocoagulation reactor chamber houses treatment electrodes having front and rear faces. Electrode positioners are located in the reactor chamber for holding the treatment electrodes, each of the electrode positioners having a feed core connectable with a high pressure source of fluid. A plurality of passages extend from the feed cores, the passages located so that jets of fluid are directed at both the front and rear faces of each of the electrodes held by the positioners.

6 Claims, 5 Drawing Sheets

U.S. PATENT DOCUMENTS

| | | | |
|---|---|---|---|
| 5,774,633 A | 6/1998 | Baba et al. | 706/25 |
| 5,897,765 A * | 4/1999 | Mercier | 205/743 |
| 5,972,216 A | 10/1999 | Acernese et al. | 210/253 |
| 6,110,375 A | 8/2000 | Bacchus et al. | 210/652 |
| 6,120,688 A | 9/2000 | Daly et al. | 210/650 |
| 6,228,255 B1 | 5/2001 | Peterson et al. | 210/90 |
| 6,325,916 B1 | 12/2001 | Lambert et al. | 205/751 |
| 6,375,847 B1 | 4/2002 | Hartmann | 210/650 |
| 6,408,227 B1 | 6/2002 | Singhvi et al. | 700/266 |
| 6,464,884 B1 | 10/2002 | Gadgil | 210/748 |
| 6,488,835 B1 * | 12/2002 | Powell | 205/744 |
| 6,607,668 B2 | 8/2003 | Rela | 210/321 |
| 6,805,806 B2 | 10/2004 | Arnaud | 210/788 |
| 6,960,301 B2 | 11/2005 | Bradley | 210/663 |
| 7,087,176 B2 | 8/2006 | Gavrel et al. | 210/748 |
| 2002/0033363 A1 | 3/2002 | Hasegawa | 210/151 |
| 2004/0026335 A1 | 2/2004 | Fields | 210/748 |
| 2004/0079650 A1 * | 4/2004 | Morkovsky et al. | 205/742 |
| 2004/0104153 A1 | 6/2004 | Yang | 210/136 |
| 2004/0140218 A1 * | 7/2004 | Gavrel et al. | 204/660 |
| 2009/0008267 A1 * | 1/2009 | Del Signore | 205/744 |

* cited by examiner

ELECTROCOAGULATION APPARATUS WITH IN-PLACE ELECTRODE CLEANING

CROSS-REFERENE TO RELATED APPLICATIONS

This patent application is a §371 national stage patent application based on International Patent Application No. PCTIIJS2008/009255, filed Jul. 31, 2008, entitled "ELECTROCOAGULATION APPARATUS WITH IN-PLACE ELECTRODE CLEANING", which is a continuation-in-part of U.S. patent application Ser. No. 11/888,512 filed on Aug. 1, 2007, entitled "Mobile station and methods for diagnosing and modeling site specific effluent treatment facility requirements". Each of the above-identified patent applications is incorporated herein by reference in its entirety.

FIELD OF THE INVENTION

This invention relates to effluent treatment, and, more particularly, relates to electrocoagulation units used in effluent treatment processes.

BACKGROUND OF THE INVENTION

Most industrial and municipal processes require water treatment facilities to treat effluents returned to the environment. Such facilities typically represent a significant investment by the business/community, and the performance of the facility (or failure thereof) can seriously impact ongoing operations financially and in terms of operational continuity.

Moreover, not all effluent treatment requires the same technologies. Industrial effluents (such as is found at coal bed methane facilities or oil production sites, for example) all have different particulate, pollutant and/or biomass content inherent to both the industrial processes as well as the particular water and soil conditions found at the site. Municipal requirements would likewise vary depending on desired end-of-pipe quality and use (and again depending on the feed water present at the site).

Electrocoagulation processes in wastewater treatment are well known. However, apparatus for performing such processes have heretofore required extensive maintenance and investment to assure proper operations. In particular, down time and personnel considerations associated with electrode maintenance (cleaning and replacement) have proven costly. Such heretofore known inefficiencies affect both overall operation of the apparatus and plant as well as apparatus longevity.

Therefore, improvement of such apparatus could still be utilized. Moreover, improved treatment technologies adapted to this and other uses can always be utilized given the criticality of provision and maintenance of clean water.

SUMMARY OF THE INVENTION

This invention provides electrocoagulation wastewater treatment apparatus having in-place electrode cleaning. The apparatus reduces maintenance and plant down time and expense, and increases equipment longevity.

The apparatus includes a primary electrocoagulation reactor chamber that houses treatment electrodes having front and rear faces. Electrode positioners are located in the reactor chamber for holding the treatment electrodes, each of the electrode positioners having a feed core connectable with a high pressure source of fluid. A plurality of passages extend from the feed cores, the passages located so that jets of fluid are directed at both the front and rear faces of each of the electrodes held by the positioners. The positioner includes an electrode mount portion, the passages located at both sides of the mount portion so that jets of fluid are directed at both of the faces of each of the electrodes. First and second electrode positioners located in the reactor chamber each for holding a different end of the treatment electrodes are preferred so that jets of fluid are directed at both the front and rear faces of each of the electrodes held by the positioners from the opposite ends thereof.

It is therefore an object of this invention to provide electrocoagulation wastewater treatment apparatus having in-place electrode cleaning.

It is another object of this invention to provide electrocoagulation wastewater treatment apparatus that provided reduced maintenance and plant down time and expense and increases equipment longevity.

It is another object of this invention to provide an electrocoagulation wastewater treatment apparatus that includes a primary electrocoagulation reactor chamber, treatment electrodes having front and rear faces, and at least a first electrode positioner located in the reactor chamber for holding the treatment electrodes, the electrode positioner having a feed core connectable with a high pressure source of fluid and a plurality of passages extending from the feed core, the passages located so that jets of fluid are directed at both the front and rear faces of each of the electrodes held by the positioner.

It is still another object of this invention to provide a positioner for use in the primary electrocoagulation reactor chamber of an electrocoagulation wastewater treatment apparatus, the apparatus utilizing a plurality of treatment electrodes having front and rear faces, the positioner having an electrode mount portion and a feed core connectable with a high pressure source of fluid, a plurality of passages extending from the feed core, the passages located at both sides of the mount portion so that jets of fluid are directed at both of the faces of each of the electrodes.

It is yet another object of this invention to provide an electrocoagulation wastewater treatment apparatus including a primary electrocoagulation reactor chamber, treatment electrodes each having front and rear faces and opposite ends, and first and second electrode positioners located in the reactor chamber each for holding a different end of the treatment electrodes, the electrode positioners each having a feed core connectable with a high pressure source of fluid and a plurality of passages extending from the feed core, the passages located so that jets of fluid are directed at both the front and rear faces of each of the electrodes held by the positioners from the opposite ends thereof.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Addressing preliminary matters, the pH of water is a means of expressing its acidity or basicity. The measurement of pH is a method of expressing hydrogen ion concentration logarithmically with the pH value being the negative logarithm (base 10) of the hydrogen ion concentration. Measurement of pH is important to water analysis, as the pH will dramatically affect the solubility of a number of slight soluble salts present in the various feed waters. pH is important in defining the alkalinity equilibrium levels of carbon dioxide, bicarbonate, carbonate and hydroxide ions. The concentrate pH is typically higher than the feed due to the higher concentration of bicarbonate/carbonate ions relative to the concentration of carbon dioxide.

Furthermore, the pH of a cleaning solution is an indicator of one of the most important mechanisms available for cleaning most membrane foulants and scale. Acidic solutions are effective at removing scale. The removal of foulants that originated from suspended solids or biological activity is performed with alkaline solution. Its high concentration of negatively charged hydroxide ions can break up and solubilize organic fats and oil that may be present. It can also disperse remaining solids since many of these tend to also have negative charge characteristics. Lowering the feed pH with acid results in a lower LSI (Langlier Saturation Index) value, which reduces the scaling potential for calcium carbonate. Feed and concentrate (reject) pH can also affect the solubility and fouling potential of silica, aluminum, organics and oil. Variations in feed pH can also affect the rejection of ions. For example, fluoride, boron and silica rejection are lower when the pH becomes more acidic.

A typical pH measurement system always consists of four parts: a pH sensing electrode; an amplifier that translates the signal (4 to 20 mA) into something the controller unit can read; a reference electrode; and on-line implementation. Each part of the system plays a critical role in the on-line measurement process. Any reputable brand of on-line pH indication, registration and controlling system could be utilized herein, for example the systems provided by SIGNET Analytical Instruments.

Conductivity measurement may be utilized to determine the ability of water to transmit electricity due to the presence of dissolved ions. Conductivity measurement is a method for determining the level of ions in water, but does not identify the ion. Because the electrical current is transported by the ions in solution, the conductivity increases as the concentration of ions increases, thus conductivity increases as water dissolves ionic species. The basic unit of conductivity is the siemens (S). Since cell geometry affects conductivity values, standardized measurements are expressed in specific conductivity units (S/cm) to compensate for variations in electrode dimensions.

Conductivity measurements are used to obtain the data necessary to determine TDS (Total Dissolved Solids) values. Furthermore, the in-line conductivity measurements are utilized in the operational software with a conversion factor to convert water conductivity into total dissolved salts. This data can then be used in software to calculate a present salt rejection based on conductivity. There is generally a direct relationship between conductivity and the concentration of ions in a solution. Any reputable conductivity indication, monitoring and registration system can be utilized (for example, CDCN-80 systems by OMEGA).

Figure 1:
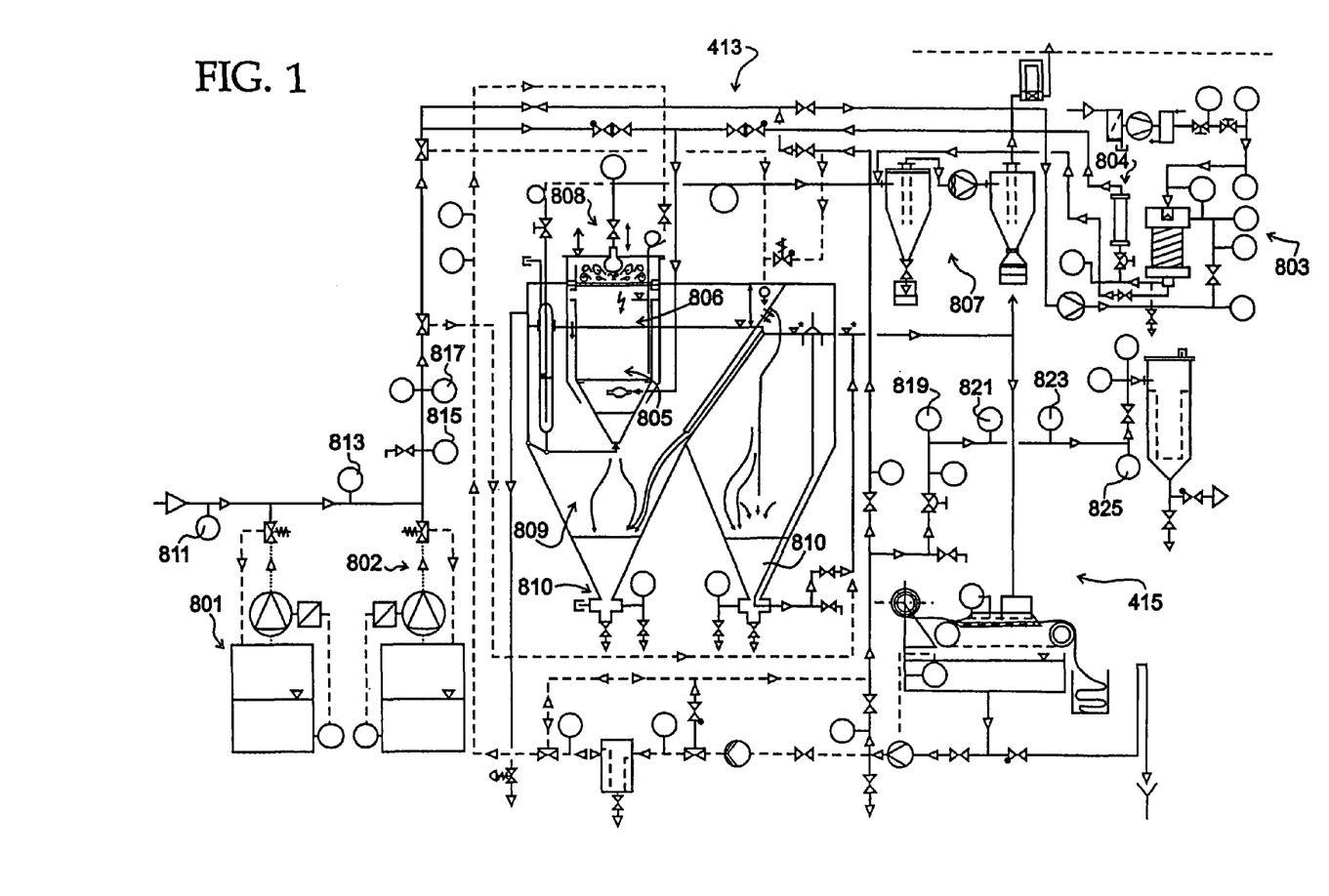
FIG. 1 is a diagram illustrating facilities for application of effluent treatment/sampling/testing processes.

FIG. 1 shows effluent treatment apparatus (in this case a pre-treatment suite) 413. These include pH and chemical dosing apparatus 801 and 802, respectively, ODE/IDI membrane aeration apparatus 803, electrocoagulation apparatus 805, dissolved air/gas flotation 806, vacuum introduced cyclone separation apparatus 807, vacuum degassing 808, lamella plate clarification 809 and sludge concentration output 810. Additionally, eight testing nodes 811 through 825 are shown.

The primary function of pre-treatment suite 413 is the removal or significant reduction (exceeding 90%) of colloidal matter with total suspended solids, such as polysaccharides or other slimy matter, less than about 75 nm. In addition, removal or significant reduction (by 80 to 90%) of fats, grease, oils and emulsions, and heavy metals (such as barium, strontium and others) by 60 to 99% is achievable. Finally, removal of entrained and produced gas by vacuum down to residual levels is achieved.

Figure 2:
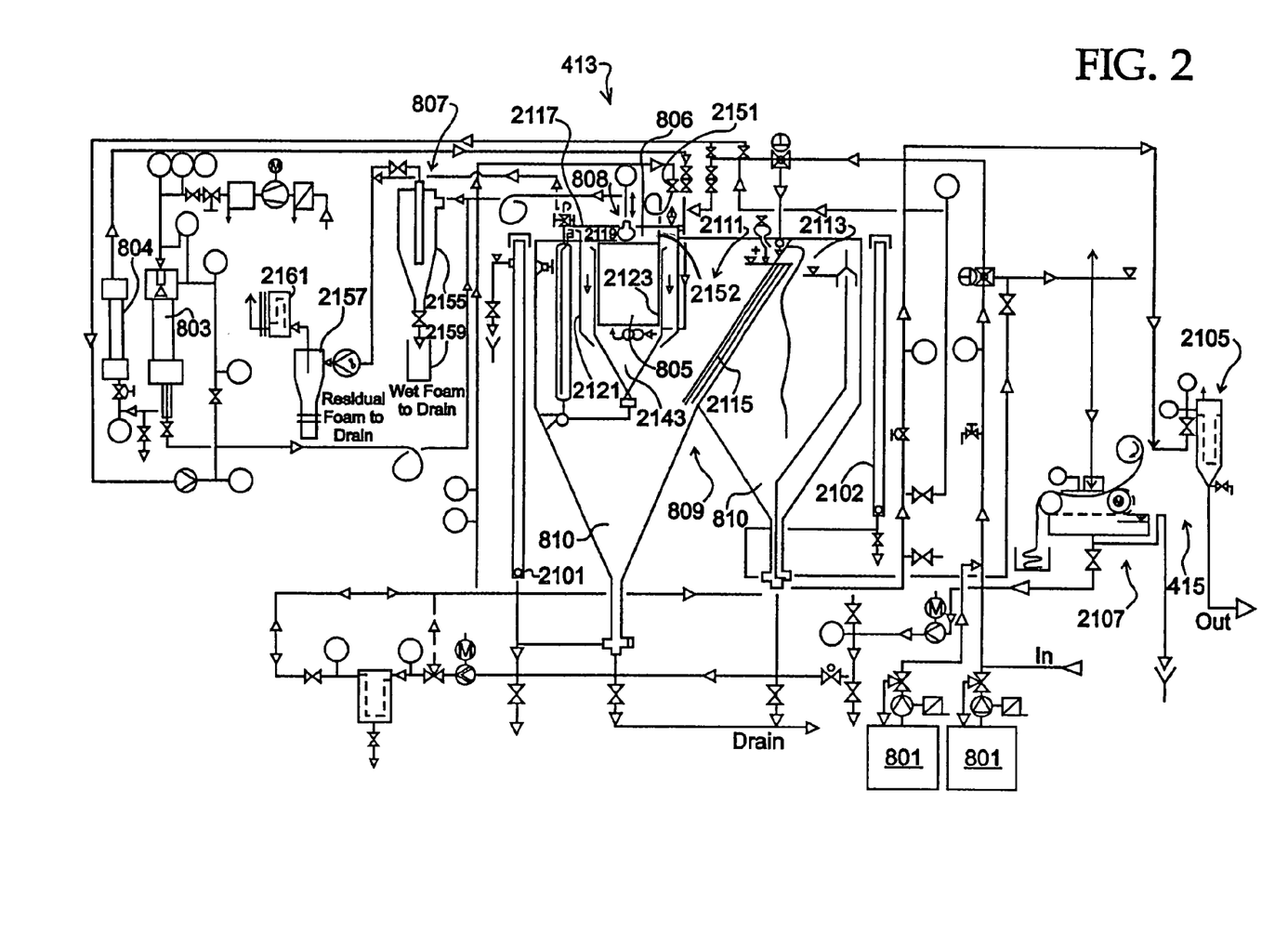
FIG. 2 is a diagram illustrating components utilized in a treatment suite including electrocoagulation apparatus.
Figure 3:
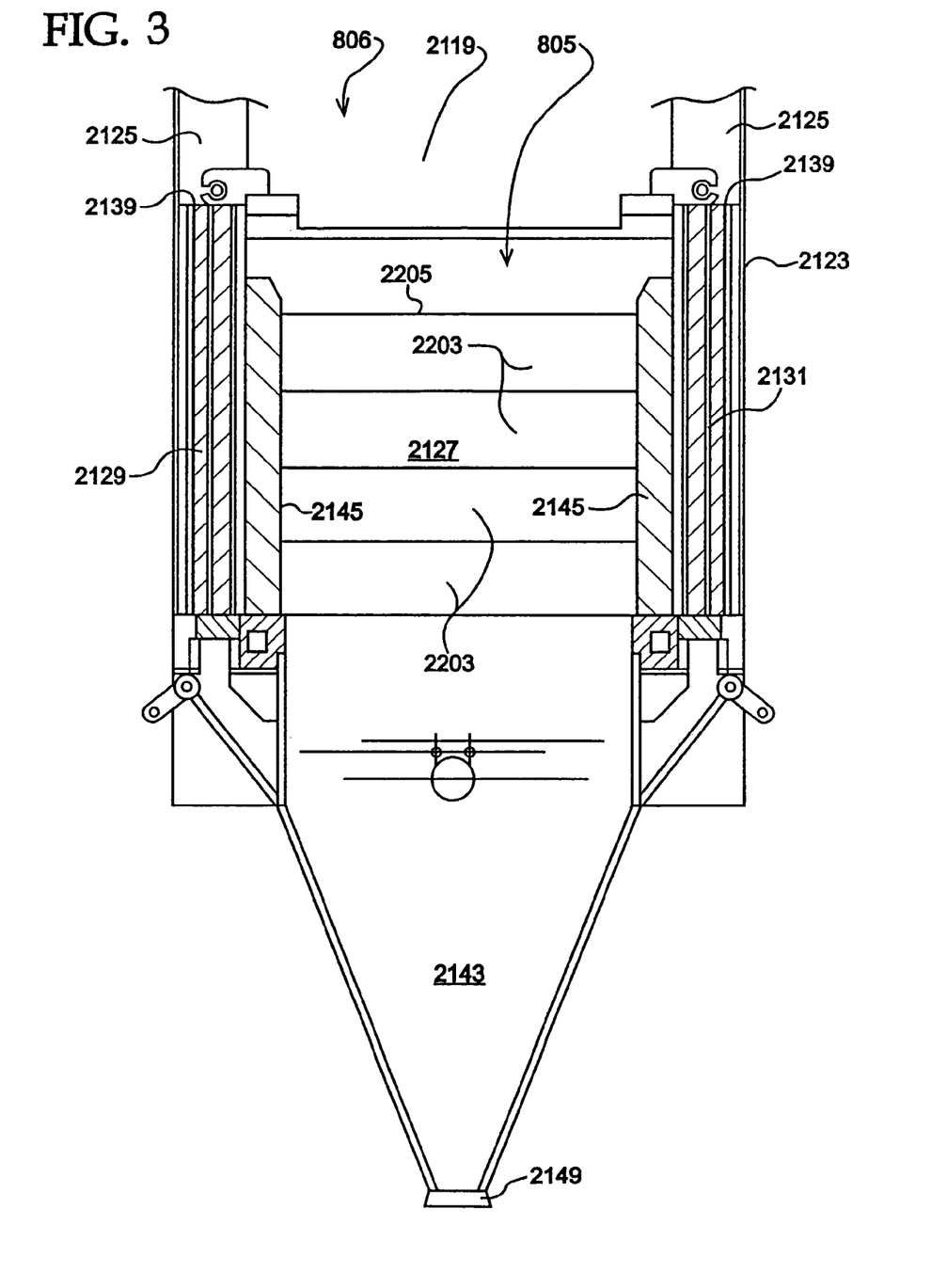
FIG. 3 is a sectional illustration of an electrocoagulation unit utilizable in the treatment suite.
Figure 4:
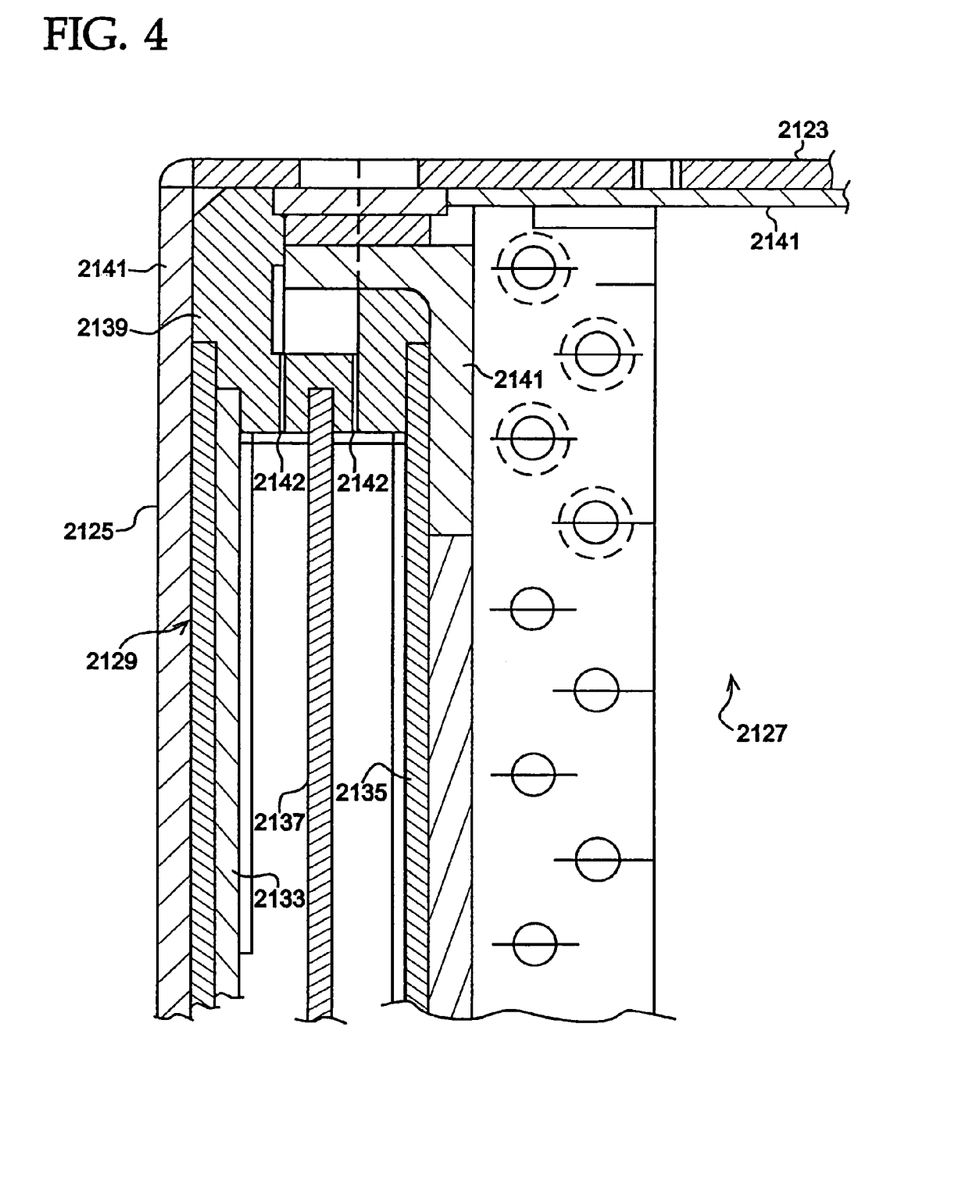
FIG. 4 is a partial sectional illustration of the housing of the unit of FIG. 3 showing one part of the in place electrode cleaning arrangement of this invention.

FIGS. 2 through 4 show various apparatus of treatment suite 413, FIG. 2 illustrating a particular arrangement thereof including the ten apparatus 801 through 810 heretofore identified configured with selected piping, flow control and instrumentation configuration. IDI inline ionizer unit 804 may be any known alpha ionizer such as the STATICMASTER series form NRD and related instrumentation. Level sight glasses 2101 and 2102 allow convenient on-site process inspection. Output from suite 413 proceeds to stage 415 including a bag filter system 2105 and belt filter system 2107.

In accordance with this invention, FIGS. 2 through 4 and the following description illustrate the electrocoagulation apparatus and configuration in pre-treatment suite 413. Electrocoagulation apparatus 805 operates conventionally but includes a number of unconventional features. In addition, apparatus 805 is positioned in tank 2111 (the larger of the two tanks 2111 and 2113 separated by separator plate 2115) of lamella plate clarifier apparatus 809. Electrocoagulation operates by the splitting off of ions from sacrificial electrodes, or utilization of non-sacrificial electrodes with native or added ions, in apparatus 805. The ions are thus introduced into the water presented for treatment to destabilize suspended, emulsified or dissolved contaminants in the water by introduction of an electrical current. The water acts as an electric conductor in which current is carried, thus forming a hydroxide compound. The most common sacrificial electrodes utilized in such apparatus are made of iron or aluminum, the most common non-sacrificial electrodes being made of carbon.

Present electrocoagulation art does not adequately address the mechanisms of flotation, sedimentation and the circulation effect of coagulant aggregation in the early stages as bridging flocs. In the electrocoagulation process, the partially lighter aggregated coagulants are transported to the liquid surface by their attachment onto the ascending electrolytic gas bubbles. The remaining, predominantly heavier, aggregated coagulants bridge to heavier, larger flocs and precipitate out into a sediment layer.

Treatment analysis in advance of establishment of the treatment regimen determines the necessary mass quantity of matter that needs to be deposited by the sacrificial electrodes. For diagnostic real time capability, the electrocoagulation reactor described hereinafter may be equipped with selective multiple electrolytic cell choices (14 cells, for example) in the primary reactor chamber.

In accordance with this aspect of the invention, the following relates to electrical apparatus for electrolytic flotation and electrochemical dosing referred to as electrocoagulation, and apparatus, configurations and methods for treating contaminated waters for selective pre-treatment and/or cleaning of the waters. Electrocoagulation presents a cost-effective alternative to traditional methods for treatment of certain polluted waters or as a method for the pre-treatment of suspensions, emulsions and light sludges prior treatment with membrane technology, for instance clean up involving gas, dissolved and suspended solids removal from a hydraulic system where chemical or electrochemical dosing, coagulation, electroflotation, flocculation and sedimentation would be employed.

Apparatus 805 of this invention allows for a variety of electrode materials to be implemented within one active electrode plate area for numerous electrolytic treatment applications. The apparatus is compact and portable for easy delivery and hookup and is used in conjunction with the other apparatus for blending air, plasma-gas and/or dissolved metal salts with the feed water. As shown in FIG. 2, a plurality of pumps for controlling the feed water flow and a plurality of conveniently located valves, regulators and pump controls for automated or manual control of the various functions of the apparatus 805 are provided. Apparatus 805 is integrated directly with dissolved air flotation apparatus 806 in clarifier apparatus 809, and is further enhanced by integration with vacuum apparatus to accelerate the electroflotation of the floc-foam layer to the liquid surface of electrocoagulation reactor (together referred to herein as "electrolytic dissolved air flotation"—EDAF—treatment).

The EDAF treatment approach utilizes a modified plate electrocoagulation reactor design. Because electrocoagulation reactor 805 is an integrated part of clarifier tank 2111 of lamella apparatus 809, shear-free sludge transfer in a compact single unit structure is provided. Vacuum enhanced electroflotation is provided through the employment of an enclosed vacuum hood 2117 above flotation chamber 2119 of flotation apparatus 806, to speed up the flotation process and as well remove unwanted created or entrained gases via vacuum degassing apparatus 808.

Vacuum hood 2117 is adjustable for proximity and vacuum lift capability to optimize the electroflotation effect as well as floc-foam surface layer removal at cyclone separator apparatus 807. Hood 2117 is mounted on outer housing 2121 holding inner reactor assembly 2123 of electrocoagulation apparatus 805. Inner assembly 2123 (FIG. 3) is defined by four corner posts 2125 (FIG. 4) together establishing primary reaction chamber 2127 and secondary reaction chambers 2129 and 2131 adjacent the primary chamber. The secondary chambers provide additional electrocoagulation treatment stages to optimize the overall electrocoagulation treatment on an as needed basis. Each secondary chamber includes an anode, cathode and bipolar electrode 2133, 2135 and 2137, respectively, held in corner post 2139 for insulating the secondary chambers as well as forming supports for insulating walls 2141 of the primary chamber. A small jet of previously clarified process water received through conduits 2142 washes electrode 2137.

Conical sludge chamber 2143 is formed below primary reaction chamber 2127 and vacuum/flotation chamber 2119 of flotation apparatus 806 is formed below chamber 2127. Primary electrode plates (either sacrificial or, preferably, non-sacrificial) are held at a plurality of electrode positioners 2145 at opposed chamber walls. This electrode framework allows rapid electrode interchangeability and/or electrode set ups specially adapted to site circumstances. For example, a composite electrode setup with electrodes of different materials combined within a single electrode stack could be utilized for treatment of complex feed waters. Bipolar electrodes 2137 of secondary chambers 2129 and 2131 are readily accessible for maintenance purposes.

Integrated sludge chamber 2143 provides buoyancy and/or electromechanically actuated sludge transfer via a sludge cone valve 2149. Sludge is transferred from sludge chamber 2143 into the fluid bed of the sludge holding/disposal chamber 810 at lamella clarifier tank 2111 of clarifier apparatus 809, thus minimizing a shear introducing gradient to the delicate floc structure within the sedimentated electrocoagulation sludge. This eliminates or greatly reduces the need for expensive floc polymers and/or coagulants as well as reducing energy requirements for the floc rebuilding process. A compound sludge chamber angle of repose of 35° for hydroxide sludge is employed thus, in conjunction with a matching sludge cone release valve, preventing sludge build up within the chamber and expediting sludge release.

A variable discharge head and distribution system may be employed to minimize surface floc-foam layer carry over from the primary chamber and provide suitable discharge distribution geometry into secondary electrocoagulation chamber(s), thus minimizing channeling and ensuring effective electrocoagulation treatment in the secondary electrocoagulation. Secondary electrocoagulation flow control may be provided through discharge disks and dampener adjustment to ascertain proper flow distribution, retention time and minimize channeling, providing an effective secondary and efficient overall electrocoagulation treatment.

Multiple flat bar electrodes 2203 forming multiple electrode stacks 2205 (only one shown in FIG. 3) are employed. These standard vertical stacks consist of electrode bars 2203 arranged one on top of another. Horizontal stacks 2205 may be arranged with electrode bars 2203 in a side by side arrangement (instead on atop one another) and secured by a top contactor clip which also provides current transfer from one stack 2205 to the next. The vertical multi-flat bar stack 2205 arrangement is more suitable to maximize sacrificial electrode life. The sacrifice of electrode material is more pronounced on the leading edge/area of the ascending feed water flow in a downward or upward directed parabolic shape. The leading edge problem can be minimized by substituting the bottom bar with a nonmetallic, but conductive graphite bar. If unacceptable, a new sacrificial bottom bar needs to be added from time to time between whole stack replacements.

The vertical multi-flat bar option provides a mechanism for active electrode area reduction without sacrificing reactor retention time by insertion of dielectric/nonconductive plate area (PVC or CPVC) into the vertical stack electrode structure in place of active electrode bar(s). This allows varying of the active surface area to volume ratio to find the optimum ratio for a particular application. This variable ratio option is an important feature in establishing scale-up of this parameter.

Required electrical field strength (dependent upon concentration levels and contaminant types in the feed water) can be manipulated by varying electrode C—C spacing for treatment optimization. Primary electrocoagulation facilities at 2127 are powered with variably applied amperage in the range of 0.1 to 60 amps. With electrode bars set in series connection mode, the same current flows through all the electrodes, and voltage is allowed to vary as electrocoagulation treatment progresses over time.

Figure 5:
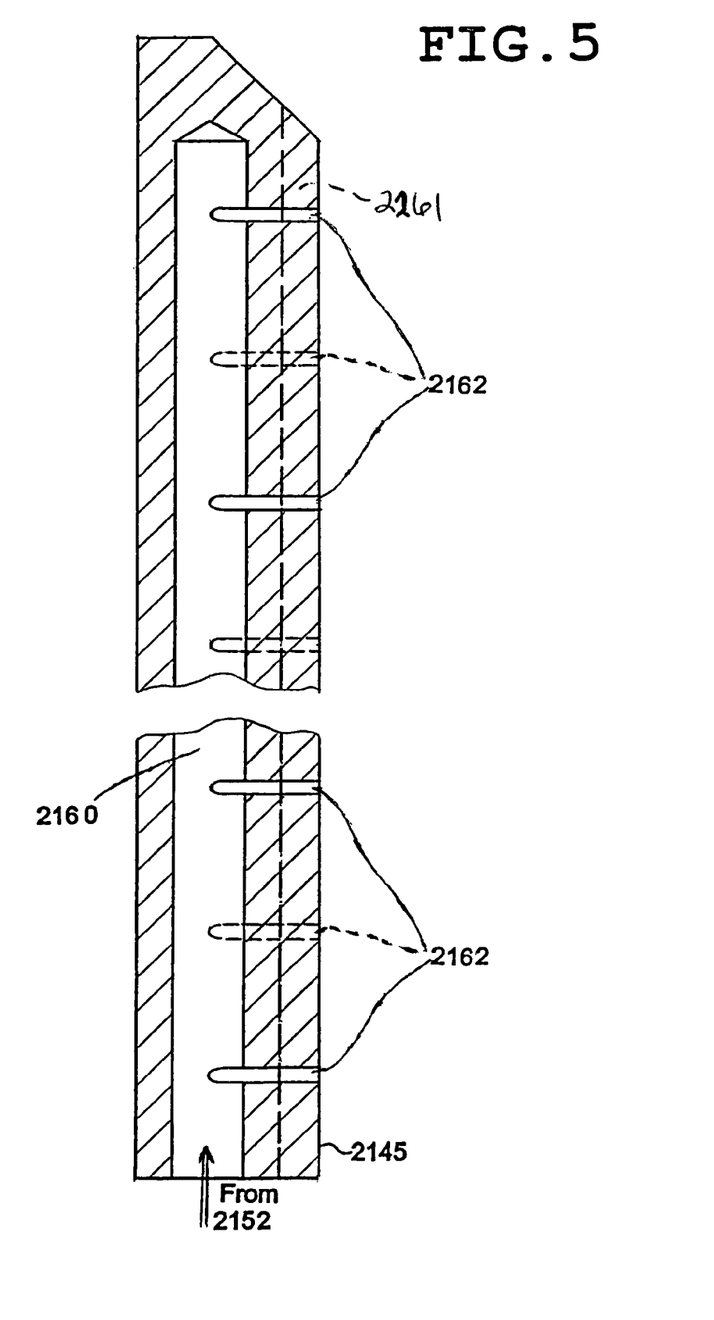
FIG. 5 is a partial sectional illustration of an electrode positioner utilized in the electrocoagulation unit of FIG. 3 illustrating another part of the in place electrode cleaning arrangement.

A crossflow electrode flushing capability option through valve 2151 and feed line 2152 is preferably provided to create a turbulent flow regime with the ascending water flow in primary electrocoagulation reactor (or reaction) chamber 2127 and with the descending flow within the secondary electrocoagulation reactor chambers 2129 and 2131 (see FIGS. 3 through 5). Flow direction of flush water jetting is staggered crosswise and perpendicular to the electrocoagulation process water flow over the electrode plates. The directed turbulent flow continually washes the sides of the electrodes and prevents or significantly retards the build-up of impermeable oxide layers (passive) on the cathode as well as deterioration of the anode due to oxidation. This can be done instead of polarity switching or, in a fine regulated mode, in addition to polarity switching in severe scaling situations or in applications that contain heavy amounts of grease or oils.

A small high pressure jet of previously clarified and pressurized process water flow is constantly or time sequentially introduced into the electrocoagulation process water flow through feed line 2152 communicating with hollow feed core 2160 of each of the electrode positioners 2145 at primary electrocoagulation reactor chamber 2127 (see FIG. 5). Positioners 2145 have electrode mount 2261 formed at one side thereof, and a plurality small (1/32", for example) holes or passages 2162 formed therethrough between feed core 2160 and the exterior of positioners 2145 to open adjacent to electrodes 2203 mounted in the mount. Holes 2162 are staggered so that the jets of fluid are directed to both front and rear faces of each of the electrodes 2203 (see FIG. 5). Secondary electrocoagulation reactor (or reaction) chambers 2129 and 2131 have a plurality of similar holes or passages 2142 (communicating with feed line 2152) drilled into spaces at insulating corner post 2139 between and close to the electrodes 2137 to direct a fluid stream toward the front and rear faces of electrodes 2137 (FIG. 4). Electrode positioners 2145 are located in the reactor chamber for holding treatment electrodes at opposite ends thereof, passages 2162 located so that jets of fluid are directed at both said front and rear faces of each of said electrodes from opposite ends thereof.

The three phase separation and removal areas of electrocoagulation reactor apparatus 805 operates as a standard parallel electrode unit (in a fluidized bed configuration a different arrangement would be applied). In phase one, light flotation solids in the floc-foam, gas ($H_2$ and $O_2$), and oil and grease layers are separated at the liquid surface and removed by the adjustable vacuum at vacuum chamber 2119. In phase two, the semi-clarified effluent of the primary electrocoagulation treated water is separated from underneath the floc-foam surface layer at chamber 2127 and is removed or transferred through adjustable disk head control devices into the secondary electrocoagulation reactor chambers 2129/2131. It is here either optionally treated or directly discharged into the settling portion of the lamella clarifier tank 2111 to develop clarity prior to discharge from the lamella separator 2115 overflow into the clear flow catch tank 2113. In phase three, the solids precipitate out into integrated primary electrocoagulation sludge chamber 2143, proceeding through the normal sedimentation process mechanics.

When operating electrocoagulation apparatus 805 with non-sacrificial electrodes, for instance with electrically conductive synthetic graphite electrodes, the necessary positively charged ions for maintaining the electrocoagulation process are partially provided by the feed water itself. The remaining part of the required positively charged ions are added in form of metallic ions such as $Al+$, $Ca+$, $Fe+$ and $Mg+$ salts. For an enhanced electron migration, the electrocoagulation process should be operated within the acidic range through chemical dosing with hydrochloric ($HCl$), sulfuric ($HS_2O_4$) or phosphoric acid ($H_3PO_4$). Utilization of synthetic graphite electrodes avoids the consumption, replacement and operating down-time associated with conventional sacrificial electrodes, and reduces energy and maintenance costs. Moreover, metallic salts are less expensive than the refined, finished, sawcut and otherwise machined or fabricated sacrificial metal electrode plates.

Synthetic (non-natural) graphite is a petroleum-based composite material (sometimes also referred to as artificial graphite) and is typically formed by any of extrusion, vibration molding, compression molding or isostatic molding processes. It can include up to four production stages: baking, graphitization, purification and impregnation. The particular synthetic graphite utilized for non-sacrificial electrodes 2203 is selected for excellent electrical conductivity, good thermal shock resistance, high mechanical strength, and low coefficients of thermal expansion and friction. A good product for this application is GR001CC from GRAPHITESTORE.COM.

To facilitate feed into chamber 2127, a longitudinal tube turns for net feed area adjustment inside of the stationary 1¼" base pipe, a defined net opening slot area distributing the whole feed through the whole length of primary electrocoagulation reactor chamber 2127. To facilitate discharge from inner reactor assembly 2123, discharge weir disk orifices are preferably provided for flow control from chamber 2127 or into secondary chambers 2129 and/or 2131. To prevent surface foam carry over into the secondary electrocoagulation treatment chambers, a positive head above the center of these orifices needs to be maintained at all times.

Through simple contact plunger manipulation at an easily accessible multinode terminal bar or bars adjacent the electrodes (either manual or automated contact manipulation could be deployed), electrocoagulation reactor operating circuitry can be arranged for different modes of operation. For parallel operation, contact plungers are provided at each electrode node at a terminal bar. This arrangement of the electrocoagulation reactor circuitry provides parallel connection using monopolar electrodes. In this mode, the electric current is divided between all of the electrodes in relation to the resistance of the individual cells. The same voltage is present in all of the contact plungers. Varying the current controls the rate of electrochemical activity For series operation, one contact plunger remains active at the terminal bar furthest from the source power connections. Insulated jumpers connect the nodes. In this mode of operation the contactor terminal bar provides series connection for the monopolar electrodes in the electrocoagulation reactor. In series cell arrangements, a higher potential difference is required for a given current to flow, because of higher cumulative resistance. The same current would, however, flow through all the electrodes. Varying the voltage controls the rate of electrochemical activity.

In a parallel, bipolar configuration (as shown in the secondary chambers 2129 and 2131, but which could be applied primarily), one contact plunger at both contactor terminal bars remains, the one furthest from the source power connections. Only the monopolar anode and cathode electrodes are connected to the electrical power connections. In this mode, bipolar electrodes with cells in parallel are used. The bipolar electrodes are placed between the two parallel anode/cathode electrodes without any electrical connections. When an electric current is passed through the two electrodes, the neutral sides of the conductive plate of the bipolar electrodes will be transformed to charged sides, which have opposite charge compared to the parallel side beside it. This cell arrangement provides, where applicable, a desirable testing platform for a full scale unit application. Its simple set-up and maintenance can lower the overall electrocoagulation operating cost.

A mixed parallel and series configuration could be provided, providing individual mixed cell circuitry configurations. For instance, in a fourteen cell reactor, half the cells could be connected in a series circuitry and the remaining seven cells connected in parallel, either as monopolar, bipolar or in mixed mode. This option can be used as a diagnostic tool when different amperages are needed for different electrode materials within the primary electrocoagulation reactor for specific treatment situations.

These parallel or series power connection choices are implemented by spring loaded contactor bars with integrated connection interchangeability (plungers). DC or AC operating power options with variable current density controls are implementable for control of electrochemical dosing and electrolytic bubble density production for sacrificial electrodes, as well as regulating the required transport current for the required added positively charged ions when nonmetallic and non-sacrificial electrodes are employed.

Controlled polarity switching for DC power implementations is provided to prevent or minimize oxide build up as well as hydrogen polarization. A vector frequency controller for the AC power option provides for frequency control below 60 Hertz to prevent disaggregation of agglomerated particles. To accommodate rapid changes of electrodes and/or customization of electrode setups, main power distribution through removable, quick release, swing away main contactor bars, providing as well for rapid change from parallel to series power connection, is utilized.

Regarding pre-treatment suite stages 411 and 413, zeta potential is an important part of the electrokinetic phenomena of interaction between particles in suspension. The zeta potential is the electrokinetic potential of a suspended particle as determined by its electrophoretic mobility. This electric potential causes colloidal particles to repel each other and stay in suspension. The zeta potential is a measurement of the overall charge characteristic of the suspended particles in the water. The kind and magnitude of the electrical charge depends on the surface potential of the particles, or the zeta potential. A negative zeta potential indicates that the water contains free negatively charged suspended solids (common in many treatment feed waters) that are stabilized and therefore more likely to stay in solution.

A neutral zeta potential indicates that the suspended solids do not carry a charge to assist in their electrical repulsion of each other. They are more likely to destabilize and coagulate into larger particulate groups and fall out of solution, and therefore being removed as part of the pre-treatment. The importance of the zeta potential rests on the fact that it can be measured experimentally and in many cases serves as a good approximation of the unmeasurable surface potential of the colloidal particle, since there is a fairly immobile layer of counter ions that sticks tightly to the surface of the particle. Treatment diagnostics herein thus uses the zeta potential measurement to gauge coagulant requirements (if any), and can be adapted for automated adjustment of an injected cationic (positively charged) coagulant such as reverse osmosis Quest 6000, which could be used in pre-treatment stage 411, to achieve a neutral zeta potential upstream of pre-treatment stage 413. Thus utilized, suspended solids would be more likely to fall out of solution into 2111 of clarifier 809.

Vacuum introduced cyclone separation apparatus 807 of suite 413 (FIG. 2) utilizes a conventional cyclone unit or units 2155 and 2157 connected for vacuum inducement apparatus 808 and hood 2119 and outlet for foam collection through filters 2159 and 2161, respectively. Filtration stage 415 (step 7) makes use conventional know bag filter systems 2105 and or belt filtration systems 2107 (such as the Roll-A-Filter or Lazy Filter fabric media systems produced by SERFILCO.

As may be appreciated from the foregoing, electrocoagulation wastewater treatment apparatus having in-place electrode cleaning will reduce maintenance and plant down time and expense, and increase equipment longevity.

What is claimed is:

1. An electrocoagulation wastewater treatment apparatus comprising:
   (a) a primary electrocoagulation reactor chamber for flowing a first water composition therethrough;
   (b) treatment electrodes having front and rear faces; and
   (c) at least a first electrode positioner located in the reactor chamber for holding the treatment electrodes, wherein the first electrode positioner comprises:
      (i) a feed core connectable with a second water composition, wherein the second water composition is different than the first water composition; and
      (ii) a plurality of passages extending from the feed core, wherein the plurality of passages are configured to flow the second water composition into the primary electrocoagulation chamber and perpendicular to the flow of the first water composition.

2. The apparatus of claim 1 further comprising at least a second electrode positioner located in the reactor chamber for holding the treatment electrodes at an opposite end thereof, the second electrode positioner having a feed core connectable with the second water composition and a plurality of passages extending from the feed core of the second electrode positioner, wherein the passages are configured so as to eject the second water composition into the primary electrocoagulation chamber and perpendicular to the flow of the first water composition.

3. The apparatus of claim 1 further comprising a valve and feed line connectable with the feed core of the positioner, the valve and feed line connected with the second water composition, wherein the second water composition is previously clarified water.

4. The apparatus of claim 1 further comprising:
   at least one secondary reaction chamber adjacent to and in fluid communication with the primary electrocoagulation reactor chamber; and
   a secondary electrode having front and rear faces mounted in the secondary reaction chamber, the secondary reaction chamber having secondary passages connected with the second water source, wherein the second passages are configured to eject the second water composition into the second reaction chamber and perpendicular to the flow of the first water composition through the secondary reaction chamber.

5. The apparatus of claim 1, wherein at least some of the plurality of passages are configured to direct the second water composition toward the front and rear faces of at least some of treatment electrodes.

6. The apparatus of claim 5, wherein at least some of the plurality of passages are configured to jet the second water composition into the first water composition so as to produce turbulent flow across the front and rear faces of at least some of the treatment electrodes.

* * * * *